United States Patent [19]

Gonzalez et al.

[11] Patent Number: 5,285,422
[45] Date of Patent: Feb. 8, 1994

[54] METHOD FOR COMPENSATING 3D DMO FOR THE EFFECTS OF AN INHOMOGENEOUS EARTH

[75] Inventors: Alfonso Gonzalez, Sugar Land; Everett C. Mobley; Ronald E. Chambers, both of Houston, all of Tex.

[73] Assignee: Western Atlas International, Inc., Houston, Tex.

[21] Appl. No.: 29,294

[22] Filed: Mar. 8, 1993

Related U.S. Application Data

[63] Continuation-in-part of Ser. No. 965,483, Oct. 23, 1992, abandoned.

[51] Int. Cl.$^5$ .............................................. G01V 1/36
[52] U.S. Cl. ................................... 367/53; 367/52
[58] Field of Search .................................. 367/50–54, 367/73

[56] References Cited

U.S. PATENT DOCUMENTS 4,878,204  10/1989  Black et al. ........................... 367/53

OTHER PUBLICATIONS

Hale, D., "Squeezing Dip Moveout for Depth Variable Velocity," Geophysics, V. 58, #2, Feb. 1993.
Berg, L. E., "Prestack Partial Migration," 54th Ann Mtg SEG, Atlanta (1984), Reprint by Geophysical Co. of Norway A.S.
Rothman et al., "Residual Migration: Applications and Limitations," Geophysics, V 50, #1, Jan. 1985.
Deregowski et al., "Geometrical Optics & Wave Theory of Constant Offset Sections in Layered Media," Geophysical Prospecting, V. 29, pp. 374–406, (1981).
Gonzales, Alfonso; Levin, Chambers, Ronald E. Franklyn K.; and Mobley, Everett, (1992) A Method of Correcting 3-D DMO for the Effects of Wave Propagation in an Inhomogeneous Earth: 62nd SEG Ann. Internat. Meeting, New Orleans, Oct. 25-29, Expanded Abstracts, 966–969.
Meinardus, Hans A. and Schleicher, Karl, 3–D Time-Variant Dip Moveout by the FK Method: 61st SEG Ann. Internat. Meeting, Houston, Nov. 10–14, Expanded Abstracts, 1208–1210. (1991).
Perkins, Wesley T. and French, William S., 3–D Migration to Zero Offset for a Constant Velocity Gradient: 60th SEG Ann. Internat. Meeting, San Francisco, Sep. 23–27, Expanded Abstracts, 1354–1357.
Dietrich, Michel and Cohen, Jack K., 3–D Migration to Zero Offset for a Constant Velocity Gradient: An analytical Formulation, Geophysical Prospecting (Jan. 1992).
Bolondi, G. and Rocca, F., Normal Moveout Correction, Offset Continuation and Prestack Partial Migration Compared as Prestack Processes, in Fitch, A. A., Ed., Developments in Geophysical Exploration Methods (Elsevier Applied Science Publ. Ltd., 1986).

*Primary Examiner*—Ian J. Lobo
*Attorney, Agent, or Firm*—William A. Knox

[57] ABSTRACT

A three dimensional residual modeling operator is applied to seismic times that have been preprocessed by application of NMO and velocity independent DMO. The residual operator compensates for vertical velocity variation and anisotropy and its use precludes the need for ray tracing.

4 Claims, 4 Drawing Sheets

METHOD FOR COMPENSATING 3D DMO FOR THE EFFECTS OF AN INHOMOGENEOUS EARTH

RELATION TO OTHER APPLICATIONS

This is a continuation-in-part of application Ser. No. 07/965,483, filed Oct. 23, 1992 and now abandoned.

BACKGROUND OF THE INVENTION

1. Field of the Invention

In the realm of 3-D migration of seismic data, this invention is concerned with the correction of a velocity independent dip-moveout (DMO) operator for the effects of earth inhomogeneities such as transverse anisotropy and ray bending due to a variation in wavefield propagation velocity as a function of depth.

2. Related Art

As is well known, DMO is a process for collapsing non-zero offset seismic wavefield ray paths to zero-offset normally-incident ray paths. DMO compensates for dip- and azimuth-dependent stacking velocities. In the presence of a constant velocity medium, the DMO operator is independent of velocity, it is two dimensional and it is oriented along a line between the source and receiver. In the presence of vertical, lateral and angular velocity changes, singly or in combination, the DMO operator becomes a three-dimensional complex surface that is velocity-dependent.

Various authors have addressed the problem by constructing a 3-D DMO operator from isochronal surfaces. An isochronal surface defines the shape of a reflector that will give the same arrival time at a fixed location in a common offset section. The required surface is found by ray-tracing. Having found the requisite surface, the DMO operator is created by performing a modeling experiment assuming coincident source-receiver locations. This and other similar techniques tend to compensate the DMO operator for refraction effects produced by velocity variations. They do not address the problem of conflict of migrated and unmigrated times. That problem arises because velocities for DMO processing need to be defined at the migrated time and location of the reflectors but because during DMO processing the data have not been migrated the energy of the reflectors is located at their unmigrated positions. That creates a velocity conflict among reflectors from different dips and azimuths. A further problem is anisotropy wherein the stacking velocity is different for different azimuths and dips.

Deregowski and Rocca showed that a velocity-independent DMO operator for a common offset section can be expressed as $$t_1 = t_0(1-(x^2/h^2))^{\frac{1}{2}}, \tag{1}$$

where $t_1$ is the zero-offset time, $t_0$ is the normal moveout (NMO) corrected time, x is the distance along the midpoint section and h is half the source-to-receiver offset. Equation (1) defines a velocity-independent 2-D DMO operator that moves energy in a vertical plane along the source-to-receiver direction. Formulation (1) may be extended to 3-D but only provided a constant-velocity earth exists. It is important to understand that the DMO operator does not attempt to move energy to its final image position. That step is performed by the migration process after stacking. DMO is merely a partial migration to zero offset before stack.

For an inhomogeneous earth wherein the velocity is a function of depth, a 2-D operator may be found which is necessarily velocity dependent. A velocity-dependent 2-D DMO operator is given by $$t_1 = t_0(1-(x^2/\gamma^2 h^2))^{\frac{1}{2}}, \tag{2}$$

where $$\gamma = (1-(t_0/v)(dv/dt_0))^{\frac{1}{2}}, \tag{3}$$

In a three dimensional inhomogeneous earth, because of ray bending, a 3-D DMO operator becomes a very complicated surface such that expensive ray tracing is necessary.

Rothman et al. introduced the concept of residual migration or the inverse operation which is sometimes referred to as modeling. Their process is valid for a constant velocity but may be extended to the case of a variable velocity. Residual migration is the process of recovering the correct image of the earth after the data have been post-stack migrated with an incorrect velocity. The correct image of the subsurface can be recovered by re-migrating the output of the first migration but using a residual velocity. Migration is a process that is applied when the first velocity is too low; modeling (inverse migration) is a process that is applied when the first velocity was too high. Thus residual migration is a process that is applied to the data but only after DMO has been applied and after the data have been stacked. The step of creating and applying a DMO operator in the presence of an inhomogeneous earth is not the same as the step of performing residual migration.

Rothman et al. did not explore extensions of their concept of residual migration to a 3-D DMO operator. However, Hale and Artley teach construction of a 2-D DMO operator, for use in the presence of a vertical velocity gradient, in their paper "Squeezing dip moveout for depth-variable velocity" in *Geophysics*, v. 58, n. 2, February 1993, p. 257. Their DMO algorithm is valid for 2-D but not for 3-D; anisotropy remains unaccounted for.

For purposes of this disclosure, the unqualified term "velocity" means the propagation velocity of an acoustic wavefield through elastic media. There is a need for a method for efficiently constructing a velocity-dependent 3D DMO operator that does not require classical ray tracing methods.

This invention fills that need by first processing and sorting the data into common offset gathers and, if needed, additionally sorting into common azimuth gathers. Normal moveout is applied to the sorted data based on the average RMS velocity to flat-lying beds. An intermediate data set is formed by applying a velocity-independent DMO operator to the normal-moveout-corrected common offset gathers according to (1). A residual 3-D DMO operator is defined and applied to the intermediate data set to compensate for inhomogeneities in the subsurface of the earth thereby to create a zero-offset data set. The so-compensated zero-offset data sets are resorted to common midpoint gathers for final processing including stacking and migration.

BRIEF DESCRIPTION OF THE DRAWINGS

These and other benefits of this invention will be better appreciated by reference to the appended detailed description and the drawings wherein.

DETAILED DESCRIPTION OF THE PREFERRED EMBODIMENT

In the method of this invention, after sorting to common offset the field data are preprocessed in the usual manner by applying normal moveout and velocity-independent DMO to form an intermediate data set having a plurality of members. As is well known, the DMO operator response is elliptical such as curve 10 of FIG. 1. If now, there is a vertical gradient in acoustic velocity due to an inhomogeneous earth, the energy will be mis-positioned because of conflicts between migrated and unmigrated times. The problem becomes serious when the 3-D effects of DMO are ignored with respect to oblique cross dips. Those ill effects are ameliorated by application of a residual 3D DMO operator to the velocity-independent DMO operator of classical data processing.

The residual operator seeks to correct for such effects as vertical velocity gradient, lateral velocity variation and anisotropy. The vertical velocity gradient refers to the increase in the acoustic velocity V as a function of increasing time, t. Lateral velocity variation refers to the regional velocity change as a function of a change in the theater of operations. A variation in the acoustic velocity as a function of angle is defined as anisotropy.

Figure 1:
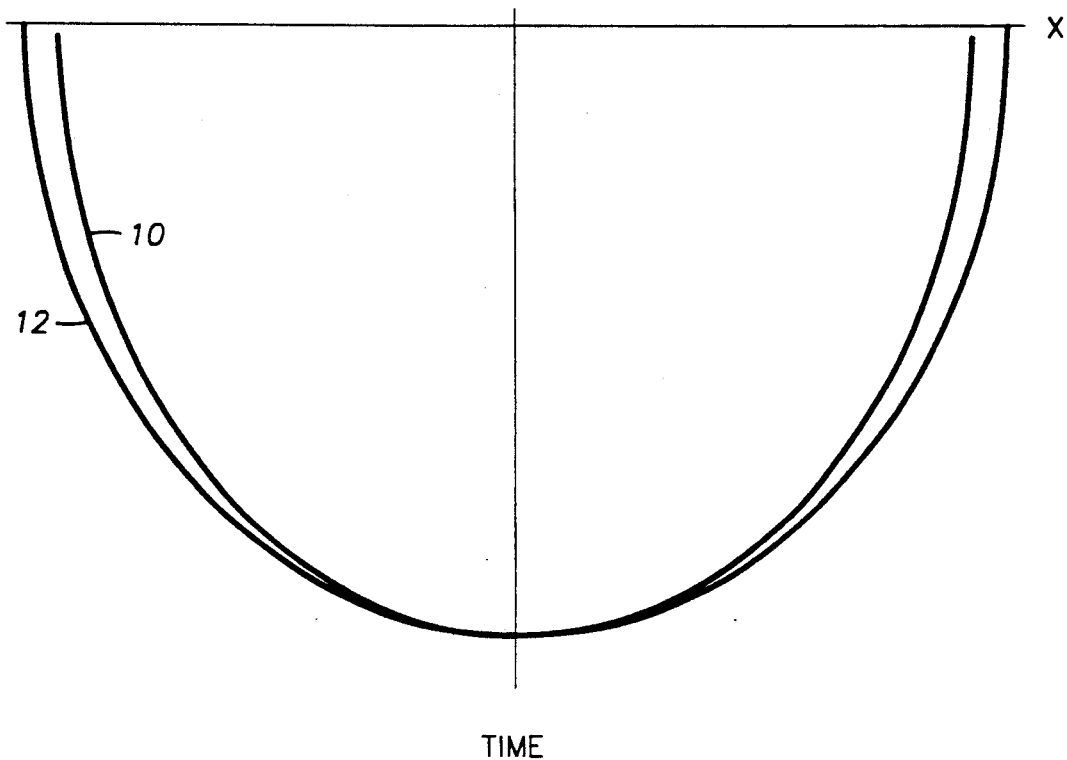
FIG. 1 is the impulse response of a velocity independent DMO and the in-line residual DMO operator that is needed to compensate for a vertical velocity variation.
Figure 2:
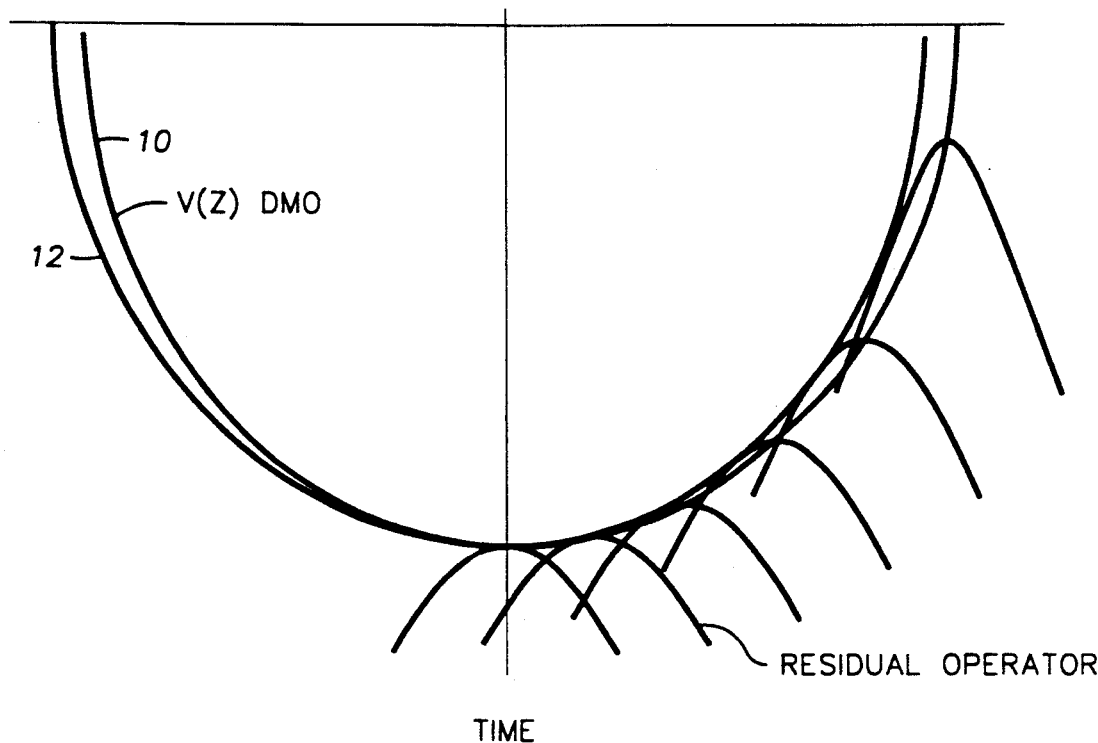
FIG. 2 is the impulse response of the cross line residual operator corresponding the situation of FIG. 1.
Figure 3:
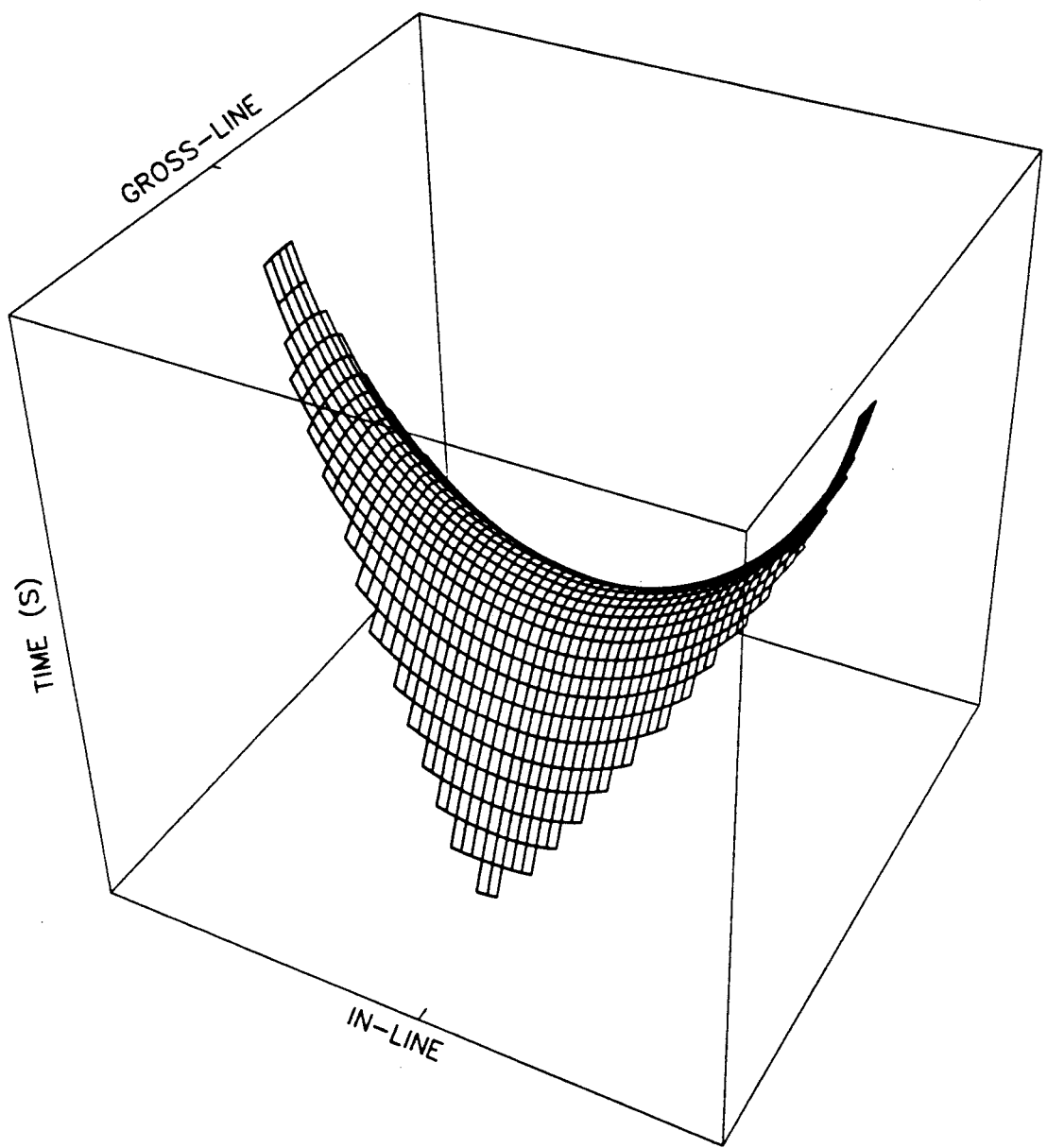
FIG. 3 is the 3D DMO operator for vertical velocity variation.

It is known that the velocity-independent DMO ellipse 10 of FIG. 1 must be compressed to compensate for certain errors in mis-positioning. Ellipse 10 can be compressed to ellipse 12 by applying a velocity-dependent residual 3-D DMO operator to the preprocessed data. A correction for the effect of a vertical velocity gradient is derived as follows;

$$t_2 = t_1(1 + ((x^2+y^2)/(\beta^2 h^2)))^{\frac{1}{2}}, \quad (4)$$

where $\beta$ is defined as $$\beta^2 = (t_0/v)(dt/dt_0), \quad (5)$$

the velocity term, v, in (5) is the RMS velocity to a flat-lying reflector at time $t_0$. Formulation (5) defines the 3-D residual DMO operatir for a depth-varying velocity and which is represented by the surface shown in FIG. 3. The quantity $t_2$ in (4) is the zero-offset time corrected for a vertical velocity gradient.

Application of that operator to the preprocessed data compensates both the in-line and the cross-line dips for mis-positioning due to a vertical velocity variation. Following application of the residual operators, The now fully-compensated data set is resorted to common midpoint gathers. The common mid point gathers are then stacked in the usual well-known manner.

Figure 4:
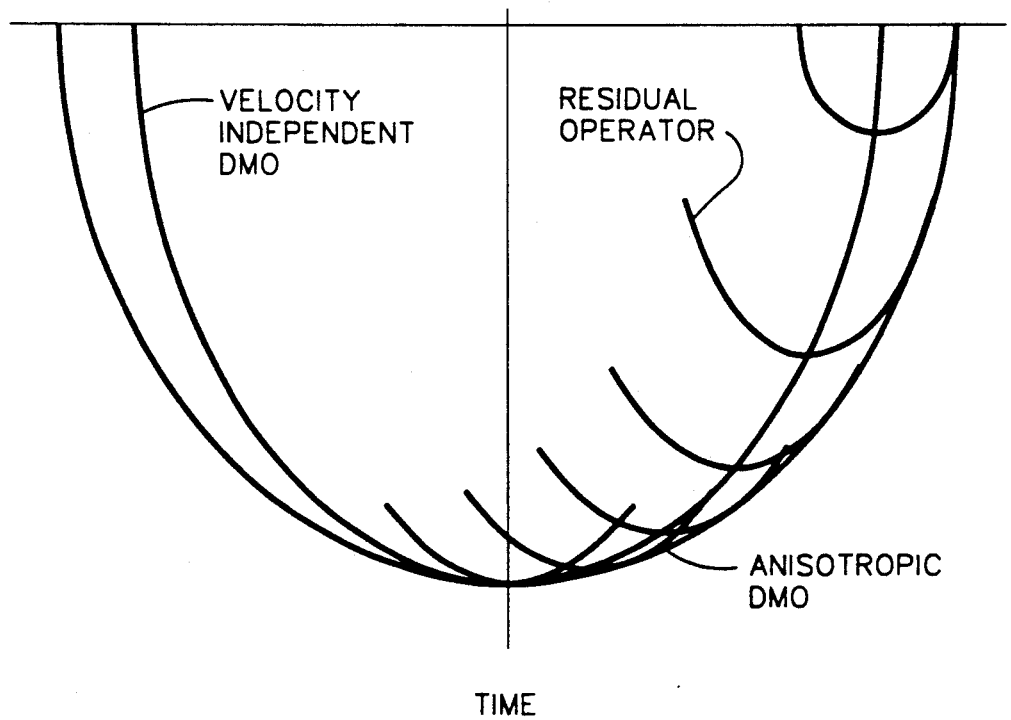
FIG. 4 maps the residual DMO operator involved with anisotropy.

Anisotropic media are characterized by a variation of the velocity as a function of angle relative to some reference direction. In many sedimentary basins, the axis of symmetry is vertical and the velocity tends to increase as the direction of propagation of the wavefield approaches the horizontal. A 3-D DMO operator should also include the effects of angular velocity dependence. The effect of angular velocity variations is illustrated in FIG. 4. We begin our analysis by employing (4) but we replace $\beta$ with a new coefficient $\delta$ that depends upon the type of anisotropy in the wavefield-propagating medium.

To estimate $\delta$, consider the cases of weak anisotropy where the velocity is assumed to vary elliptically with angle $$V_\theta^2 = V_v^2 \cos^2\theta + V_h^2 \sin^2\theta \quad (6)$$

where $\theta$ is the wave propagation angle, $v_v$ is the vertical velocity and $v_h$ is the horizontal velocity.

As is known, the DMO phase shift is given by $$\Delta t_D = (h^2 k^2)/(2t_2 \omega^2), \quad (7)$$

where k is the wavenumber, $\omega$ is the frequency and the other symbols have the meanings previously shown. If the NMO is applied with the vertical velocity, there will be an NMO error, the residual moveout being $$\Delta t_\theta = 2h^2/t_2(1/v_v^2 - 1/v_\theta^2). \quad (8)$$

Define $\alpha = v_h/v_v$ and making use of (6), we have $$\Delta t_o = ((2h^2)/(t_0 v_v^2))((\cos^2\theta + \alpha^2 \sin^2\theta - 1)/(\cos^2\theta_o + \alpha^2 \sin^2\theta_o)) \quad (9)$$

where $\theta_o$ in (9) is a reference angle for a target dip in the data. Formulation (9) may be reduced to $$\delta^2 = ((1-\alpha^2)/(\cos^2\theta_o + \alpha^2 \sin^2\theta_o)) - 1. \quad (10)$$

Figure 5:
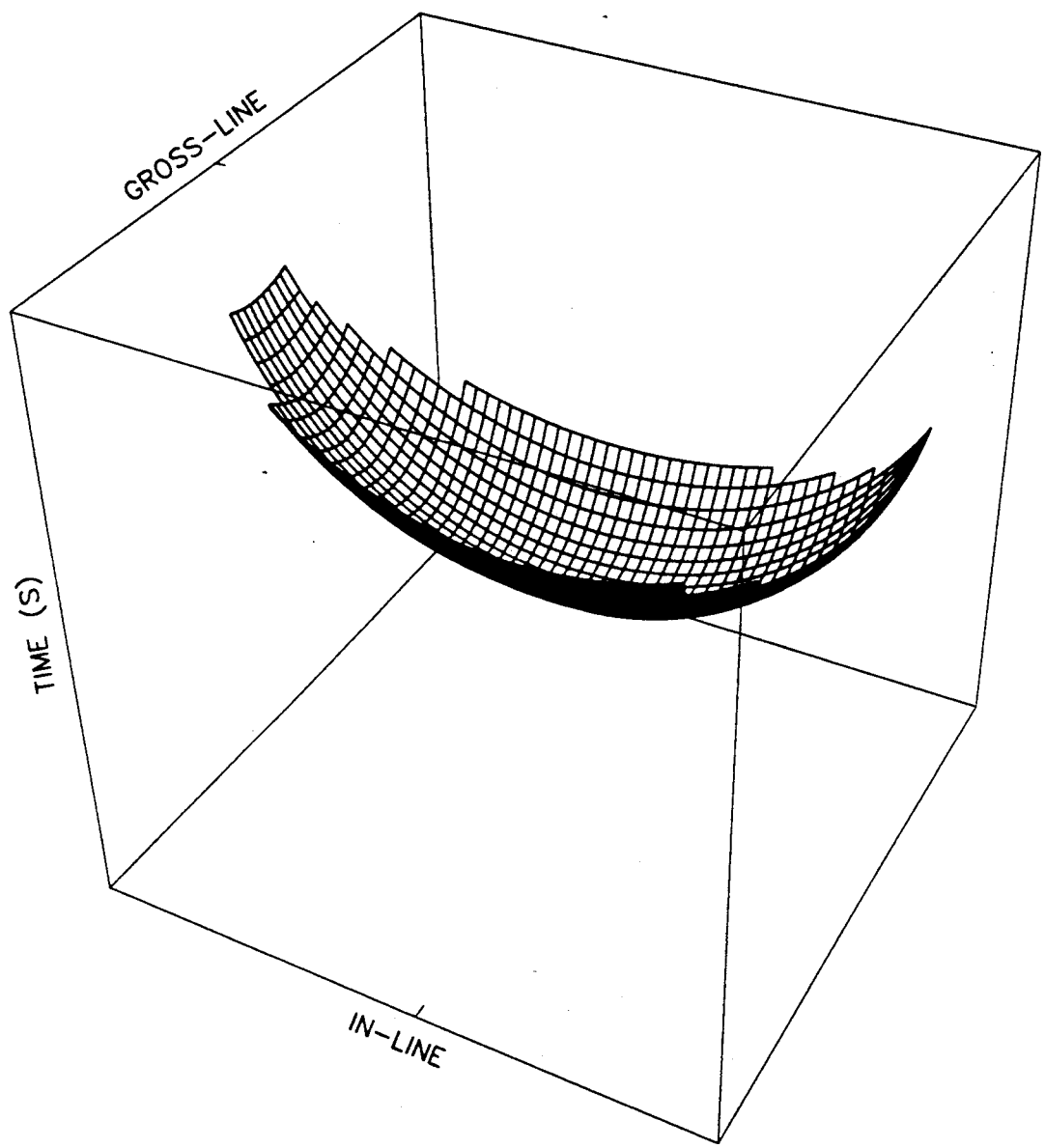
FIG. 5 is the 3-D DMO operator for anisotropy.

Equation (10) defines the complex surface illustrated in FIG. 5.

A composite 3-D residual DMO operator $\gamma_c$ to compensate for the effects of the presence of both a vertical velocity gradient and anisotropy is defined as $$\gamma_c^2 = \beta^2 \times \delta^2 \quad (11)$$

An intermediate data set $t_1$ may be corrected for all inhomogeneities of the earth to form a corrected zero-offset data set $t_2$ by executing (12) below:

$$t_2 = t_1(1 - (x^2+y^2)/(h^2 \gamma_c^2))^{\frac{1}{2}}. \quad (12)$$

The data represented by $t_2$ is thereafter resorted to common midpoint gathers, stacked and migrated.

This invention has been described with a certain amount of specificity by way of example but not by way of limitation. The operators are applied directly to the initially-preprocessed data sets which can then by migrated and imaged without tedious, expensive ray tracing.

What is claimed is:

1. A method for three-dimensional migration of seismic data to zero offset in the presence of an inhomogeneous earth, comprising the steps of:

sorting the seismic data into a combined common offset and common azimuth gather;

applying normal moveout to the sorted data gathers, said normal moveout being based upon the average RMS velocity to flat-lying beds corresponding to the recorded travel times;

forming an intermediate data set $t_1$ by applying a velocity-independent dip-moveout (DMO) operator to the normal-moveout-corrected data gathers;

defining a three-dimensional (3-D) residual DMO operator $\gamma_c$;

forming a zero-offset data set $t_2$ by applying said 3-D residual DMO operator to said intermediate data set; and resorting said zero-offset data set to a common midpoint gather.

2. The method as defined by claim 1, wherein:
said 3-D residual DMO operator includes a term that compensates for a vertical velocity gradient.

3. The method as defined by claim 2, wherein:
said 3-D residual DMO operator includes a term that compensates for an azimuthal variation of velocity as a function of angle relative to a reference direction.

4. The method as defined by claim 1, including the steps of:
forming said zero-offset data set by executing the operation indicated by $$t_2 = t_1(1-(x^2+y^2)/(h^2\gamma_c^2))^{\frac{1}{2}},$$

where x and y are orthogonal surface coordinates and h is one-half the source receiver distance.

* * * * *